US008447733B2

(12) United States Patent
Sudhakar

(10) Patent No.: US 8,447,733 B2
(45) Date of Patent: May 21, 2013

(54) TECHNIQUES FOR VERSIONING FILE SYSTEMS

(75) Inventor: Gosukonda Naga Venkata Satya Sudhakar, Bangalore (IN)

(73) Assignee: Apple Inc., Cupertino, CA (US)

( * ) Notice: Subject to any disclaimer, the term of this patent is extended or adjusted under 35 U.S.C. 154(b) by 893 days.

(21) Appl. No.: 11/949,231

(22) Filed: Dec. 3, 2007

(65) Prior Publication Data

US 2009/0144342 A1 Jun. 4, 2009
US 2011/0191294 A2 Aug. 4, 2011

(51) Int. Cl.
*G06F 17/30* (2006.01)

(52) U.S. Cl.
USPC ........................................ 707/638

(58) Field of Classification Search
USPC .................... 707/203, 204, 201, 200, 638
See application file for complete search history.

(56) References Cited

U.S. PATENT DOCUMENTS

| | | | | |
|---|---|---|---|---|
| 4,941,059 | A * | 7/1990 | Grant | 360/72.1 |
| 5,288,982 | A * | 2/1994 | Hosoya | 235/454 |
| 5,897,636 | A | 4/1999 | Kaeser | |
| 6,286,013 | B1 * | 9/2001 | Reynolds et al. | 719/328 |
| 6,647,399 | B2 | 11/2003 | Zaremba | |
| 7,139,781 | B2 | 11/2006 | Young et al. | |
| 7,213,040 | B1 * | 5/2007 | Stokes et | 707/203 |
| 8,156,090 | B1 * | 4/2012 | Curles | 707/694 |
| 2004/0193564 | A1 * | 9/2004 | Ban et al. | 707/1 |
| 2004/0267838 | A1 * | 12/2004 | Curran et al. | 707/204 |
| 2005/0027862 | A1 * | 2/2005 | Nguyen et al. | 709/225 |
| 2005/0076066 | A1 * | 4/2005 | Stakutis et al. | 707/200 |
| 2006/0101092 | A1 * | 5/2006 | Ishida et al. | 707/203 |
| 2007/0156687 | A1 | 7/2007 | Idicula et al. | |
| 2007/0179997 | A1 * | 8/2007 | Nooning, III | 707/204 |
| 2007/0244935 | A1 | 10/2007 | Cherkasov | |

OTHER PUBLICATIONS

Wright, Charles P, et al., "A Versatile and User-Oriented Versioning File System" 2004, p. 1-14.*
Cornell, Brian, et al., "USENIX '04 Paper: Wayback: A User-level Versioning File System for Linux", https://db.usenix.org/events/usenix04/tech/freenix/cornell/cornell_html/, 1-18.
Muniswamy-Reddy, Kiran-Kumar, et al., "FAST '04 Paper: A Versatile and User-Oriented Version File System", https://db.usenix.org/events/fast04/tech/full_papers/muniswamy/muniswamy_html/, 1-32.

* cited by examiner

*Primary Examiner* — Etienne Leroux
(74) *Attorney, Agent, or Firm* — Fish & Richardson P.C.

(57) ABSTRACT

Techniques are presented for versioning file systems. Files and directories are versioned in a manner that permits the versions to be mounted on a device of a user. The original security restrictions that existed with the versions when they were versioned are retained with the mount. Moreover, the user can browse and access the versions via the mount using an existing file system of the user's device. Further, names for each of the versions include detailed information that reveals the relationship of each particular version to its parent version.

43 Claims, 4 Drawing Sheets

TECHNIQUES FOR VERSIONING FILE SYSTEMS

COPYRIGHT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the example data listings as described below and in any drawings hereto: Copyright© 2007, Novell, Inc. of Provo, Utah—All Rights Reserved.

BACKGROUND

Data and information are rapidly becoming the life blood of enterprises. Transactions with customers, operational data, financial data, corporate intelligence data; in fact, all types of information are now captured, indexed, stored, and mined by enterprises in today's highly competitive and world economy.

Since information is vital to the enterprise, it is often made available twenty-four hours a day, seven days a week, and three hundred sixty-five days a year. To achieve this, the enterprises have to implement a variety of data replication, data backup, and data versioning techniques against their data models or their data warehouses.

For example, an enterprise may periodically capture the state of its data for a particular volume as a snapshot. If something should happen to the volume, it can be completely restored to a saved snapshot state. Another technique mirrors a volume on multiple volumes, such that if one volume is down or not accessible, another volume is automatically made available unbeknownst to the users. This is often referred to as data replication or failover support.

In still more cases, an enterprise may desire to permit different versions of files in the data warehouse to be captured, archived, and restored on demand by a user. This may be useful for a variety of reasons. For example, a user may download a file and work with it offline and could then lose the file due to a hardware failure. In another case, a user may make changes to a file and then determine that a previous version was more acceptable or more desirable. In either case, if the files are versioned, the user can retrieve a desired version of a file from an archive or versioning volume.

With respect to file versioning a variety of issues exist with today's approaches. More particularly, today's file versioning techniques generally: do not permit users to locally mount remote versions of their files; do not permit users to utilize existing file system operations against versioned files; do not permit users to use existing browsers to view versioned files; impose size limitations on the length of string names associated with versioned files; do not permit directories and directory path's to be versioned properly; do not permit hard links to be addressed with the versioned files; do not retain security restrictions from version to version, which are enforced based on a versioned file's access restrictions that existed at the time that versioned file was versioned, etc.

Thus, it is desirable for improved versioning file systems that permit users to view, access, and easily comprehend versioned files/directories as if these files/directories were natively their own files/directories local to their computer environment.

SUMMARY

In various embodiments, techniques are provided for versioning file systems. More particularly and in an embodiment, a method is provided for features of a versioning file system. A versioning directory is mounted on a device of a user. Furthermore, a separate directory is presented for each different version of a directory that is associated with the user within the versioning directory when accessed by the user. Additionally, versioning details are provided with each separate directory and with each versioned file to the user. The versioning details are part of names that are associated with each separate directory and with each versioned file, which are also displayed to the user within the versioning directory.

DETAILED DESCRIPTION

According to an embodiment, the techniques presented herein may be implemented within Novell products distributed by Novell, Inc. of Provo, Utah. Of course it is to be understood that any network architecture, device, proxy, operating system (OS), or product may be enhanced to utilize and deploy the techniques presented herein and below.

Figure 1:
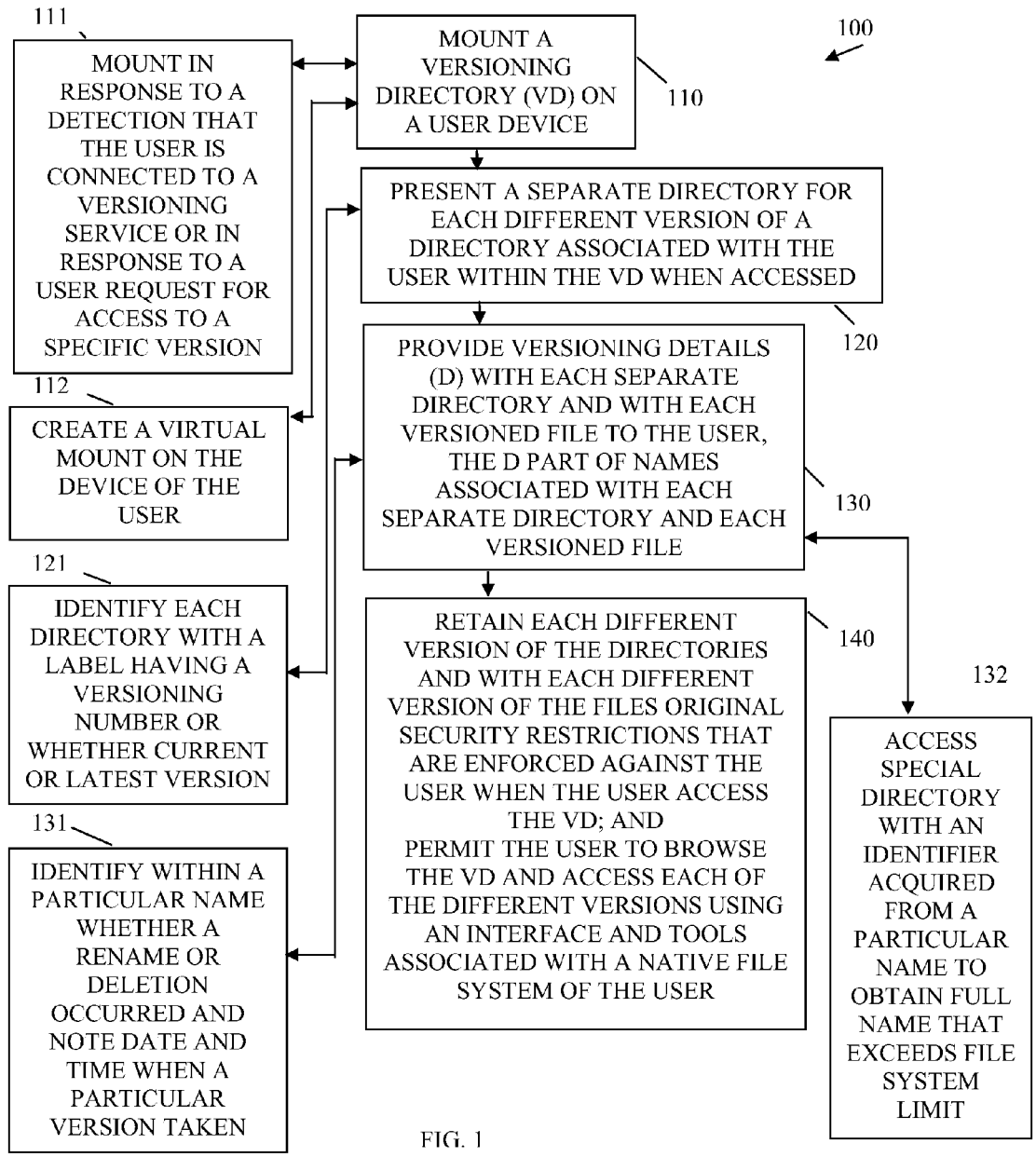
FIG. 1 is a diagram of a method for features of a versioning file system, according to an example embodiment.

FIG. 1 is a diagram of a method 100 for features of a versioning file system, according to an example embodiment. The method 100 (hereinafter "versioning service") is implemented in a machine-accessible and machine-readable medium and is accessible over a network. The network may be wired, wireless, or a combination of wired and wireless.

The versioning service is implemented on and processes on a versioning server machine. Users interface with the versioning service on client machines over the network for purposes of having files and directories versioned and for purposes of retrieving, browsing, and accessing those versioned files and directories.

At 110, the versioning service mounts a versioning directory on a user's device. This permits the user to access versioned files and directories as if they were locally accessible to the user and they appear within the user's native home or root directory of the user's native file system.

According to an embodiment, at 111, the versioning service mounts the versioning directory in response to an event detection that the user is connected to the versioning service or in response to a specific user request that is being made for a specific version of a particular file or a particular directory.

In one case, at 112, the versioning service creates a virtual mount on the device of the user using the native file system of the user, such as but not limited to UNIX/LINUX.

At 120, the versioning service presents a separate directory for each different version of a directory associated with the user within the versioning directory when accessed by the user. So, the normal subdirectories that appear on the user's home or root directory are displayed in a similar manner under the versioning directory, if those subdirectories include any versions or where subject to prior versioning.

In an embodiment, at 121, the versioning service identifies each directory with a label. The label further identifies a version number or whether a particular directory is a latest or current version. Thus, the normal directory name appears for a versioned directory and appended thereto is a label that indicates whether that particular versioned directory is the latest version and if not the latest version an Integer number serially identifies what version that particular versioned directory is associated with.

At 130, the versioning service provides versioning details with each separate directory and with each versioned file to the user and within the user's own file system. The versioning details are part of the names for the directories and files displayed to the user within the versioning directory and on the user's native file system.

According to an embodiment, at 131, the versioning service identifies within a particular names whether a rename operation or deletion has occurred with the directory or file being versioned with respect to its parent. The name also includes the date and time for when the version was taken or the rename/deletion occurred. This information is included with the string text associated with the name and is what is presented to the user.

In some cases, at 132, the versioning service may also an identifier that is appended onto at least one file name of a file or directory being versioned. The issue here is that the with the added versioning details the original name for the file or directory may now exceed a maximum permissible string length for a file or directory name within the user's file system. So, to permit the versioned name for the file and directory to be viewable in the user's file system, the versioning service truncates the original name and includes an identifier. The user can then use the identifier to access a special directory and obtain a file named by the identifier within the special directory. When the user reads this file the full name of the directory of file that was versioned is obtained. In this manner, the full name of the file and directory is retained even when the versioned name exceeds the file name length within the user's native file system.

Detailed examples for creating and presenting the versioning details are presented in the comprehensive example described below.

At 140, the versioning service retains each different version of the directories and retains with each different version of the files the original security restrictions (access control lists (ACLs)). The security restrictions are maintained and enforced within the versioning directory for the versions on the user's file system. Moreover, the user is permitted to browse the versioning directory and access each of the different versions using an interface and tools associated with the native file system of the user.

In other words, the techniques presented above permits a user to access, browser, and view versioned directories and files as part of the user's local file system. Conventionally, this has not been possible and special tools and interfaces were needed to browser and/or access versions. Here, the user maintains a normal experience within his/her environment and uses normal tools to retrieve versions and each version is named in such a way that the user can readily ascertain relationships between each of the versions.

For purposes of illustration and comprehension example implementation details and scenarios are now presented to further describe processing associated with the versioning service. The details that follow may also be incorporated in the processing associated with the methods 200 and 300 of the FIGS. 2 and 3 and the system 400 of the FIG. 4. Each of these methods are discussed later herein and below.

Initially, assume a UNIX or Linux operating system (OS) environment, such that to avoid confusion between the OS's virtual file system (VFS) abstraction layer that exists, the processing associated with the method 100 uses an archive versioning file system (AVFS). An example implementation of that AVFS as illustrated via the processing of the method 100 of the FIG. 1 and its architecture is now presented.

1. Epoch & File Filters

The versions can be taken at every epoch which is configured, say every 30 minutes; the epoch being configured by an administrator. The files for which versions are be taken can also be configured by the administrator through /proc/ kind of entries or by having a file with special name in the root of the file system or through tool, which does a special ioctl (Input/Output control operation typically available with the OS's Application Programming Interface (API)) kind of call on a root inode or any file of the versioning file system etc. by specifying the file names with or without path names using regular expressions. Similarly files for which versions should not be taken can also be specified by the administrator in the similar way. The exclusions take precedence over inclusions. In other words, any defined exclusion that is not to have a version taken overrides any inclusion. Thus, hard coded files can be specifically excluded from the versioning process.

2. When to Version

When a file is modified or some security attributes are changed after an epoch, it will be saved as new file (Versioning File Inode (VFI), explained later herein) and the old file is versioned. After that if the new file is changed (data/metadata) before next epoch then no version is taken.

The file is versioned only if the file's name matches with a filter set by the administrator or if overriding policy dictates notwithstanding the filter. In the case where hard links to files are detected, all file names are checked and if anything matches then it will be versioned.

3. User Interface

For each volume or disk partition where AVFS is residing, a virtual entity of type avfs_virtual (a different type than AVFS) is created, which can be mounted in read-only mode by the administrator. For example, if the directory "/home" has an AVFS then the administrator can mount a corresponding virtual volume on the user device as directory "/ver_home." The /home and /ver_home directories are uses henceforth with the example illustration being presented herein.

Any user space utility can work on the versioned files by looking inside this /ver_home directory. The files and directories are appended with the name "<version number>," where version_number is an integer beginning with 1. By looking at a modified time, when the directory or file was last modified can be ascertained by the user. A latest version is available in /home and the versions along with the latest one are available in /ver_home. The latest one is also numbered with "_<version number>" in the /ver_home directory.

For example, if there are 2 directories called "sd" and "ssudhaka" in /home then the user "sd" can go into /ver_home directory and may see the following directories as output for "ls-l" operation:

drwxr-xr-x 6 root root 128 2007-05-15 14:03./
    drwxr-xr-x 25 root root 584 2007-07-03 11:11../
    drwxr-xr-x 23 sd users 1232 2005-07-10 11:13 sd_version_1/
    drwxr-r-x 6 sd users 3232 2006-01-10 15:14 sd_version_2/ drwxr-x--x 55 sd users 2776 2007-03-10 13:6 sd_version_
  3/
drwxr-xr-x 69 sd users 1234 2007-07-10 17:11 sd_version_latest/
drwxr-xr-x 6 ssudhaka users 987 2006-06-26 10:18 ssudhaka_version_1/
drwxr-x-x 9 ssudhaka users 4562007-03-26 19:17 ssudhaka_version_2/
drwxr--r-x 11 ssudhaka users 152 2007-06-26 14:13 ssudhaka_version_latest/
  © Novell, Inc. 2007

Note that the latest version is available with the tag "version_latest."

Assume that the user does a "cd" (change directory operation via the OS's API) to sd_version_2 after looking at its modified time and sees the following output (selective segments are underlined and bolded for purposes of discussion):

drwxr-xr-x 6 sd users 128 2007-05-15 14:03 ./
drwxr-xr-x4 sd users 584 2007-07-03 11:11 ../
-rwx------1 ab users 2314 2004-07-03 17:49 a.out_version_1
-rwx------1 sd users 3123 2005-07-03 17:49 a.out_version_2
-rw-------1 sd users 9786 2004-07-03 17:49 .vimrc_version_1
-rw-------1 sd users 9123 2005-07-03 17:49 .vimrc_version_2
-rw-------1 sd users 1234 2006-07-03 17:49 .vimrc_version_latest
drwxr-xr-x 4 sd users 320 2004-06-22 16:11 Telugu_version_1/
drwxr-x--x 4 sd users 987 2005-06-22 16:11 Telugu_version_2/
drwxr--r-x 4 sd users 3214 2006-06-22 16:11 Telugu_version_3/
drwx------6 root root 648 2004-06-19 15:41 temp_deleted_200606221611_version_1/
drwxr-xr-x 6 sd users 648 2005-06-19 15:41 temp_deleted_200606221611_version_2/
drwxr-xr-x 6 sd users 648 2005-07-19 15:41 temp_deleted_200301121114_version_1/
drwxr-x--x 6 sd users 648 2005-08-19 15:41 temp_deleted_200301121114_version_2/
drwxr-xr-x 6 sd users 648 2007-05-19 15:41 temp_version_1/
drwxr-x--x 6 sd users 765 2007-06-19 15:41 temp_version_2/
  © Novell, Inc. 2007

The above listing has a wealth of details or metadata for the user to readily view and evaluate to determine relationships of the various versioned filed and directories. For example, "a.out_version_1" cannot be read/executed by "sd" because the owner, "ab," did not give read and execution rights. Also, there are two timestamps for "temp_deleted_." This shows that the temp directory was created at two times and deleted at two times. So, both are in fact different versions. The temp_version shows that the temp directory is again created a third time and also has versions available. Further, temp_deleted_200606221611_version_1 has root as the owner so that other users cannot go into that directory. Note that there are no files (except .vimrc) with version_latest tag, since the directory is an old version and not the latest version. But, .vimrc has one such file. This means that the same file is not changed in this versioned directory and is also available in the latest directory too.

Assume that the user traverses inside directory Telugu_version_2. Now he/she sees the following files as output of "ls" (not "ls-l" listing operation for the OS's API):
Pothana.zip_version_1
Pothana.zip_pothana.ttf_11_1234ABCD_200301121114_renamed_to
  © Novell, Inc. 2007

The above file shows detailed metadata in its name showing that Pothana.zip was renamed to pothana.ttf (11 is used to automatically resolve the length of first name) into a directory represented by the inode 1234ABCD at the time 200301121114. How to get the directory associated with this inode is discussed in greater detail below. For now, assume that it maps to the temp_version_2 directory. If the user traverses to the directory temp_version_2 he/she sees a file with the following name:
pothana.ttf_Pothana.zip_11_ABCD1234_200301121114_renamed_from
  © Novell, Inc. 2007

The name is self explanatory and ABCD 1234 represents the directory "Telugu_version_2."

If there are further versions of this file later then they may be available in temp_version_2 as follows:
pothana.ttf_version_1
pothana.ttf_version_2
pothana.ttf_version_latest
  © Novell, Inc. 2007

Now how an inode is mapped to a directory name is presented. There is a directory called "dir_path" in /ver_home which has "x" access mode set and so just directory searching is permitted for the user. The user can then read file /ver_home/dir_path/ABCD1234_200301121114 and get the contents of the file as "/sd/Telugu" if he/she has permissions on the directory "/sd" at the point in time represented by timestamp 200301121114. If the directory has more nested sub directory levels, say, "/sd/1/2/3/4/5" then the permissions are checked on all the sub directories for the user to see if he/she has rights to "see" or "search" the file at that point in time.

Similarly by giving the name 1234ABCD_200301121114 the user can get the name "/sd/temp".

From the timestamp and modified time of the directory the user can decide under which version of Telugu or temp he/she can look into.

The renaming of directories is dealt with in the same manner discussed above.

However, note that a new version of directory is created only when security attributes of it are modified or if a rename happens. To get all the files/subdirectories in a given directory at some point in time, the user can use the modified time of those datasets and filter them. There is not a version for a directory whenever files are added or deleted between epochs. Another different example is provided at later herein.

Additionally, graphical user interfaces (GUI's) can be used to provide value added service and a more user-friendly interface in retrieving versions of the files by automating and linking. For example, a user may right mouse client on files in the /home directory to see what is in the /ver_home directory for those files. Additionally, automated scripts can provide detailed narratives for files to assist the user in understanding the relationships of the versioned files to other versions. These are but a few examples, as many automated services can be used to utilize the valuable versioning information retained with the versioned files and directories that have been discussed above and that will be further discussed below.

3. Files

There are two kinds of inodes.

Each file inode mainly contains inodes of different versions of the same file. A first type of inode is a container inode, referred to as File Container Inode (FCI). A contained versioned inode is the second type of inode and is referred to as a Versioned File Inode (VFI). One FCI can have multiple VFIs. An integer in the FCI has the value of an inode for the latest version; this is referred to as a Latest Version Inode Number (LVIN). The inode associated with the file is that of the FCI on a normal mount for the /home directory. For versioned mount of the /ver_home directory, the inodes are associated with VFIs and the versioned files are available there. When OS's VFS retrieves an inode through super block operations like read_inode then if the inode is that of FCI (on /home) then the AVFS creates an in-memory inode for this file using latest versioned file's inode (pointed by LVIN in FCI).

When a file is created the file name, the creation time and parent directory inode (DCI, defined later) are stored in a table. So, there is a reverse link (pointer or reference) to the parent directory from the file. If there is any hard link created, then the file name, creation time and its parent directory inode are stored in the same table as another entry of the table. If there are any more hard links they are also stored in the table. This table is pointed by a pointer or reference, which is stored in the container inode of the file (FCI); the table is referred to as a Name Table (NT). Apart from file name, creation time and parent directory inode there are also a deletion time entry and a flags variable (Integer) stored with each entry of the table. 3 of the bits of the Integer are used for 3 different flags. The following are the three flags:

Deleted: When this is set it means that the file was deleted in the directory represented by the directory inode in the entry.

Renamed_To: The file is renamed to the said file name in the entry to the directory represented by the directory inode in the entry.

Renamed_From: This means that the file was renamed from the name in the entry from the directory represented by the directory inode in the entry.

The flags integer is set to null for normal creation and initial configuration.

When a file is renamed then the NT is duplicated and the "Renamed_From" flag is set in the entry that has the old file name data (name, creation time, parent directory inode) in the new NT. A new entry is also made in a new NT with "Renamed_To" flag set and the new file name; its parent directory inode and the time of creation (rename time here) are also stored in it. When the new NT is again created then the old data entry (the entry that has "Renamed_From") is deleted in the new NT after duplication.

A pointer in the FCI has the value for the latest NT; this is referred to as a Latest Name Table Number (LNTN). All the VFIs, when created, have a pointer that stores the latest value pointed to by the LNTN at that time; this is referred to as a Name Table Number (NTN). For example, if LNTN has 123 and a new VFI is created, then the new VFI has the NTN with the value of 123. Suppose now that a rename happens after that situation, in response to this circumstance a new table is created and the table number is stored in the LNTN. For example, assume the LNTN has the value 987 now. When a new VFI is created now, new VFI has the value 987 in its NTN. Also, when the NT is duplicated (upon a rename or upon new link), the latest VFI's NTN is changed to a new LNTN. If another rename or new link occurs before a next epoch, then the NT is again duplicated and noted in the LNTN. Now, the latest VFI's NTN is changed to the new LNTN. At this point the old NT is freed, since it is not used by anyone else because the duplication happened within an epoch period of time. This situation can be detected by comparing the NTN of the previous VFI against the old NT.

When a file is deleted from a directory, the corresponding entry's flag (within the current NT) is set to "Deleted". The deletion time is also noted in the entry. All other inode attributes, such as but not limited to a modification time, are stored in the proper VFIs.

Each VFI has a link to its FCI. So, any given VFI can be accessed to traverse back to its particular FCI.

3. Saving Modified File

Each time a file is versioned, the file is allocated new blocks and the new file is written in the new blocks. The data, metadata and inode are allocated for the new file. The new file's inode number is stored in the FCI and the LVIN has this new inode number. At this point, the old file is versioned. All this is done only when data is modified. The same thing is done when metadata of a file is modified, such that the security attributes (mode and Access Control List (ACL), etc.) are changed. Nothing is done when other metadata of a file is modified, instead of copying all the data of the file in some case a copy on write (COW) can be processed.

4. Directories

The directory data for versioned directories include the following two parts:

(1) The data containing the mappings between file/subdirectory names and their inode numbers. Actually there is a table with an entry for each file or subdirectory. The entry has three things. A flags Integer variable, current name of file or subdirectory, the inode (FCI or DCI) of it. One of the bits of the flags Integer variable indicates whether the entry is active or not in the current directory; this is referred to as a "Current" flag. If this flag is set, then in the /home directory somewhere (say /home/sd/temp), the contents when queried have this entry in the results presented. If the Current flag is not set that means it is either deleted or moved to some other directory; the table housing the entry is referred to as a List Table (LT).

(2) The directory data also includes other metadata of the directory having all timestamps, attributes, modes, permissions, ACLs, etc.

Directory inodes are stored in manners similar to what was presented above with files. Specifically, each directory inode has inodes of different versions for the same directory; this is referred to as a Directory Container Inode (DCI). A versioned inode for a directory is referred to as a Versioned Directory Inode (VDI). One DCI has multiple VDIs. An Integer in DCI represents the inode number of the latest directory version; this is referred to as a Latest Version Inode Number (LVIN). The DCI does not have the metadata of the directory. The inodes of the different versions of the directory contain metadata of the each versioned directory. The inode associated with the directory is that of DCI. When the OS's VFS receives an inode through super block operations like read_inode then the AVFS creates an in-memory inode for this directory using latest versioned directory's inode (pointed to by the LVIN in the DCI).

The DCI has a pointer to the latest LT; this is referred to as a Latest List Table Number (LLTN). The latest VDI stores the latest value pointed to by LLTN at its time of creation; this pointer references a List Table Number (LTN). For example, if a LLTN has 123 and the latest VDI has the LTN with the value of 123. Assume that some of the security attributes, such as the mode, are changed or a rename operation happened, then a new table is created by copying all the entries for which the "Current" flag is set because the new users should not be able to see the deleted or renamed versions. Now the table number is stored in the LLTN. Say, LLTN has the value 987 now. The same value is also stored in the new VDI, which is created. Remember also that a new version of directory is created only when security attributes are changed or when a rename happens. The new VDI also will have the value 987 in its LTN. So, what this means is that each VDI stores the LT at of its own and DCI includes the pointer to the latest LT.

Similarly there is one name entry, which has the name of the directory, the creation time of the directory and parent directory inode and a deletion time of the directory (discussed later herein); this entry is referred to as a Name Entry (NE). The DCI includes a pointer that stores the address of NE; this pointer is represented as a Latest Name Entry (LNE). All the VDIs have a pointer that has value in the LNE at the point of creation for the VDI; this pointer is represented as a Name Entry Number (NEN). When a directory is renamed, the new name and the time at which the rename happened (analogous to creation time) are again stored in a new NE and the LNE is modified to have LNE now. The latest VDI created (because of a rename operation) also has this NE in its NEN. This happens for any further rename operations as well.

All other inode attributes specific for the versioned directory, such as but not limited to a modified time, are stored in VDI.

Each VDI has a link to the DCI. So any given VDI can be referenced to get to its corresponding DCI.

When a directory is being deleted, the deletion time is noted in the same NE pointed to by the latest VDI.

Also, the root directory need not be versioned.

5. File Operations in /Home

The file system here behaves as if it is a normal one without displaying any versions. The inode numbers of DCIs and FCIs for which a "Current" flag is set are shown in the /home directory. When retrieving files or when applying access restrictions, the latest VFI and VDI are used.

6. File Operations in /ver_home

When a user enters a directory in the root of the /ver_home directory and does an "ls" then no inode numbers of DCI and FCIs are shown. Instead, for every DCI and FCI stored, in the directory entries, the VDIs and VFIs of the sub directories and files are enumerated and returned with their inode numbers.

When returning VFIs, depending on the data in the NT of each VFI, the inodes are either included or excluded. Also the VFIs are looked at with the latest as being the first or most recent version and previous versions are retrieved by going back from latest. This is useful in naming the files or directories appropriately. As an example consider a file that has 4 VFIs. The NT (The tuple containing file name, creation time, parent directory inode, deletion time, flags variable) stored in each VFI can be like this:

1. Latest VFI:
    file2, 200606221611, 1234ABCD, 200706221611, {Deleted}
    link_file1, 200607221611, ABCD1234, 0, { }
2. Next Latest VFI:
    file2, 200506221611, 1234ABCD, 0, { }
    link_file1, 200506221611, ABCD1234, 0, { }
3. Next Latest VFI:
    file2, 200506221611, 1234ABCD, 0, { }
    link_file1, 200506221611, ABCD1234, 0, { }
4. Next Latest VFI:
    file2, 200506221611, 1234ABCD, 0, { }
5. Next Latest VFI:
    file2, 200506221611, 1234ABCD, 0, { }
6. Next Latest VFI:
    file2, 200506221611, 1234ABCD, 0, {Renamed_To}
    file1 , 200406221611, 12341234, 0, {Renamed_From}
7. Next Latest VFI:
    file1 , 200406221611, 12341234, 0, { }
8. Next latest VFI:
    file1 , 200406221611, 12341234, 0, { }
    © Novell, Inc. 2007

The illustration starts from the last VFI ($8^{th}$ one). Here, the file was named as "file1" with its parent DCI as 12341234. It was created at 200406221611. The next version of the file was taken after some time and so the same data is available in $7^{th}$ one. After that, a rename operation happened from the directory represented by 12341234 to 1234ABCD at 200506221611 and the new file name is "file2". The same file is versioned until the $4^{th}$ one. So, there are 3 versions in the directory represented by DCI 200506221611. After that, a hard link is made to the file from the directory represented by ABCD1234 at 200506221611 with the file name "link_file1". After that, one more version was taken (the $2^{nd}$ one). After that, the file in directory represented by 1234ABCD was deleted at time 200706221611.

Assume further that the directory names are the same as that of the DCIs that are mentioned in the above entries.

So when the user enters into the directory 1234ABCD, he/she sees the following files (output of "ls"):
    file2_file_5_200406221611_12341234_renamed-_from_deleted_200706221611_version_1 ($6^{th}$ one)
    file2_deleted_200706221611_version_2 ($5^{th}$ one)
    file2_deleted_200706221611_version_3 ($4^{th}$ one)
    file2_deleted_200706221611_version_4 ($3^{rd}$ one)
    file2_deleted_200706221611_version_5 ($2^{nd}$ one)
    file2_deleted_200706221611_version_6 ($1^{st}$ one)
    © Novell, Inc. 2007

When the user enters into the directory ABCD1234, he/she sees the following files (output of "ls"):
    link_file1_version_1 ($3^{rd}$ one)
    link_file1_version_2 ($2^{nd}$ one)
    link_file1_version_latest ($1^{st}$ one)
    © Novell, Inc. 2007

Here, the last version is includes a "latest" tag, since the file is still available in the other directory because it is a hard linked file.

When the user enters into the directory 12341234, he/she sees the following files (output of "ls"):
    file1_version_1 ($8^{th}$ one)
    file1_version_2 ($7^{th}$ one)
    file1_file2_5_200406221611_1234ABCD_renamed_to_version_3 ($6^{th}$ one)
    © Novell, Inc. 2007

When accessing the versions of the files, the access restrictions are applied using the data stored in individual VFIs and VDIs.

Similarly the directory rename operations are taken care of by using the NENs stored in the VDIs.

7. Max File Name

If a particular file name exceeds a string length limit allowed by a user's file system after appending the detailed versioning relationship information discussed herein and above, then the name of the file is truncated to minimum required and a string_<id_number>_max_name is appended to the file's name. For example instead of the file name:

"abcdefghijklmnopqrstuvwxyzab-
cdefghijklmnopqrstuvwxyzabcdefghijklmnopqrstu
vwxyzabcdefghijklmnopqrstuvwxyz_version__1," the
following name is returned for "ls": "abcd_version__1__
1234ABCD1234__200406221611_max_name,"
assuming max file name allowed is 45. Here, the file's id is given by 1234ABCD1234. Now, the user can get the name of the file by reading the contents of the file /ver_home/id/1234ABCD1234__200406221611. The special directory "id" has "x" mode and so user has only search permission. The id is comprised of the inode number of the VFI and the index into the NT of the VFI. With this info the AVFS can retrieve the file's name and give it out as needed. 200406221611 represents the timestamp of the file.

If the file is under the directory "/sd" then the permissions are checked for the user on the directory "/sd" at the point in time represented by timestamp 200406221611 before letting him/her open /ver_home/id/1234ABCD1234__200406221611. If the directory has more nested sub directories, say, "/sd/1/2/3/4/5" then the permissions are checked on all the directories for the user to see if he/she has rights to "see" or "search" the file at that point in time. If there are hard links, since there can be more than one reverse link, all these paths are verified to see if the user has permissions and if the user has permission in at least one path then the permission is granted otherwise an error is returned.

Additionally, users can write custom scripts to extract whatever he/she wants from the versioning information discussed, created, and managed by the techniques discussed herein.

8. Deletion

The AVFS can, in some situations, consume a lot of space and thus it is better to delete old versions. This can be done by a thread/automated service in AVFS that periodically checks and deletes old versions according to a policy setup by an administrator.

In alternative embodiments, there can be another mount point, say /rootonly/maintain_home. Where /root only has only rwx (read, write, and execute) permissions only for root. For each volume or disk partition where AVFS is residing, a virtual entity of type avfs_virtual_maintain (a different type than AVFS and avfs_virtual) is created, which can be mounted in read-write by the administrator. This mount point is like /ver_home but has write access. Since /rootonly can only be traversed by root, only a script that runs as root can go into that directory and delete all extra versions if the total number of the versions crosses a threshold or delete all versioned files older than some predefined time stamp.

In still another case, a special ioctl can be used on a second mounted system (avfs_virtual) on the file or an ioctl can be processed on the root inode or any other file with inode or <path name> of the file to be deleted as parameter.

The versioning service may be implemented on a host server that maintains one or more primary volumes for files of users. The users operate off of clients networked to the host server. The host server also communicates with a snapshot volume and a versioning or archive service and volume. The snapshot volume houses snapshots of the primary volume and the versioning or archive volume house versions of selective or all files associated with the primary volume.

Figure 2:
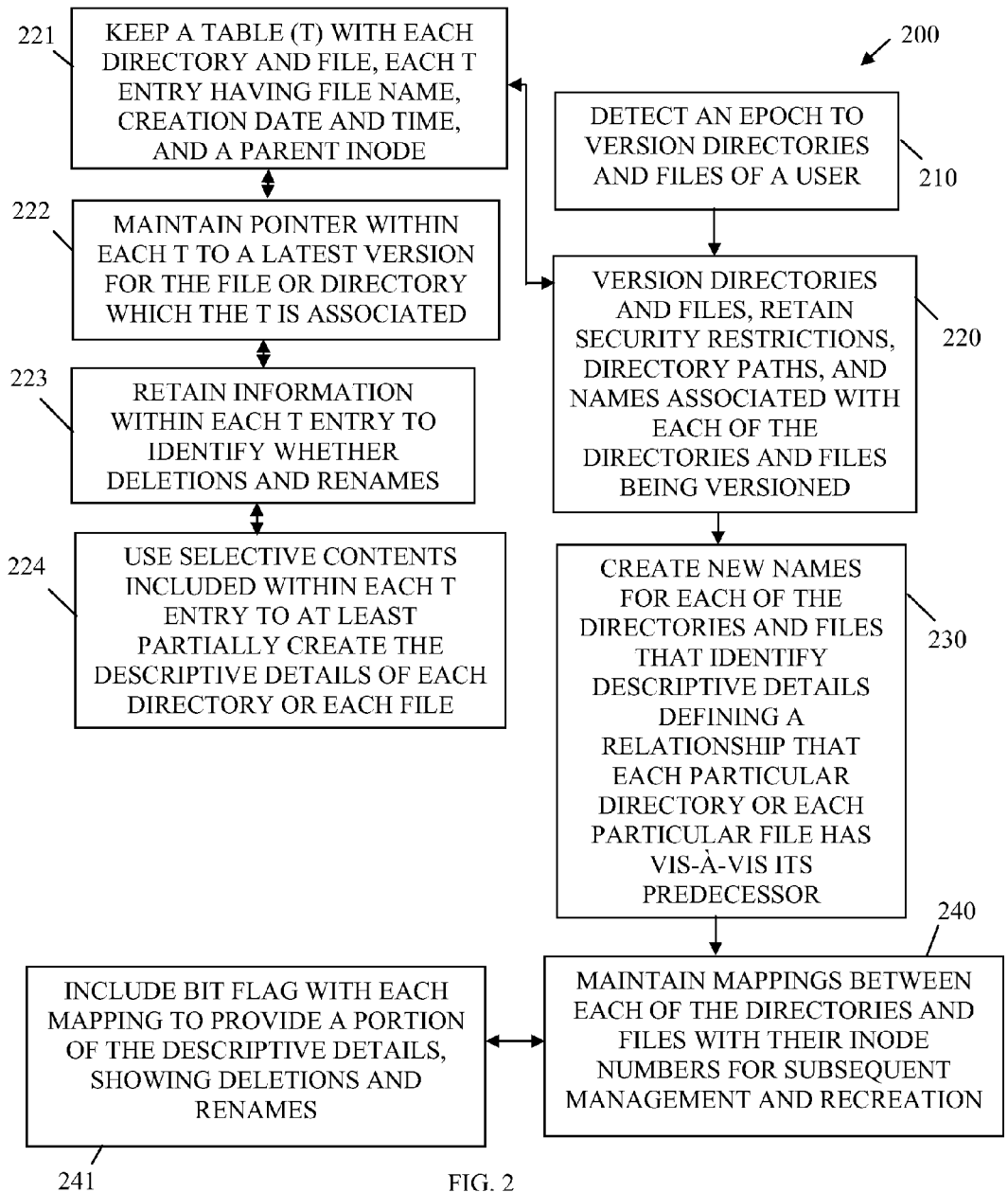
FIG. 2 is a diagram of another method for features of a versioning file system, according to an example embodiment.

FIG. 2 is a diagram of another method 200 for features of a versioning file system, according to an example embodiment. The method 200 (hereinafter "file system versioning service") is implemented in a machine-accessible and readable medium and is accessible over a network. The network may be wired, wireless, or a combination of wired and wireless. The file versioning service presents an alternative perspective and in some cases an enhanced perspective to the versioning service represented by the method 100 of the FIG. 1.

At 210, the file system versioning service detects an epoch for which versioning is to take place for directories and files of a user. The epoch is a configurable period of time and the specific files or directories to be versioned can be defined in a variety of manners, some of which were described above with reference to the method 100 of the FIG. 1 and within the context of the comprehensive example that was presented.

At 220, file system versioning service versions each of the directories and files. When the versioning process takes place, the file system versioning service retains: security restrictions, directory paths, and names associated with each of the directories and files that are being versioned.

According to an embodiment, at 221, the file system versioning service keeps a table with each direction and file. Each table entry of each table includes a file name, a creation date and time, and a parent directory inode.

In some cases, at 222, the file system versioning service also maintains a pointer within each of table that references a latest version for the file or directory to which the particular table is associated.

In still more situations, at 223, the file system versioning service retains information within each table entry to identify whether rename operations or deletion operations have taken place with the particular file or directory version that is being versioned with respect to its parent.

In yet another embodiment, at 224, the file system versioning service uses selective contents included within each table entry to at least partially create the descriptive details (discussed below with reference to the processing at 230) of each directory or each file.

At 230, the file system versioning service creates new names for each of the directories and for each of the files. The new names include the original names of the files or directories being versioned as well as descriptive details that defines a relationship that each particular directory or that each particular file has vis-à-vis its predecessor version (parent). The comprehensive example presented above presents illustrations for creating, using, and presenting the descriptive details.

According to an embodiment, at 240, the file system versioning service maintains mappings between each of the directories and files with their respective inode numbers for subsequent ease of management and recreation for a user requesting access to the versioned directories and versioned files.

In a particular case, at 241, the file system versioning service includes a bit flag with each mapping to provide a portion of the descriptive details. The bit flag identifies deletions and rename operations. Examples of this were presented above with the comprehensive example and the FIG. 1.

Figure 3:
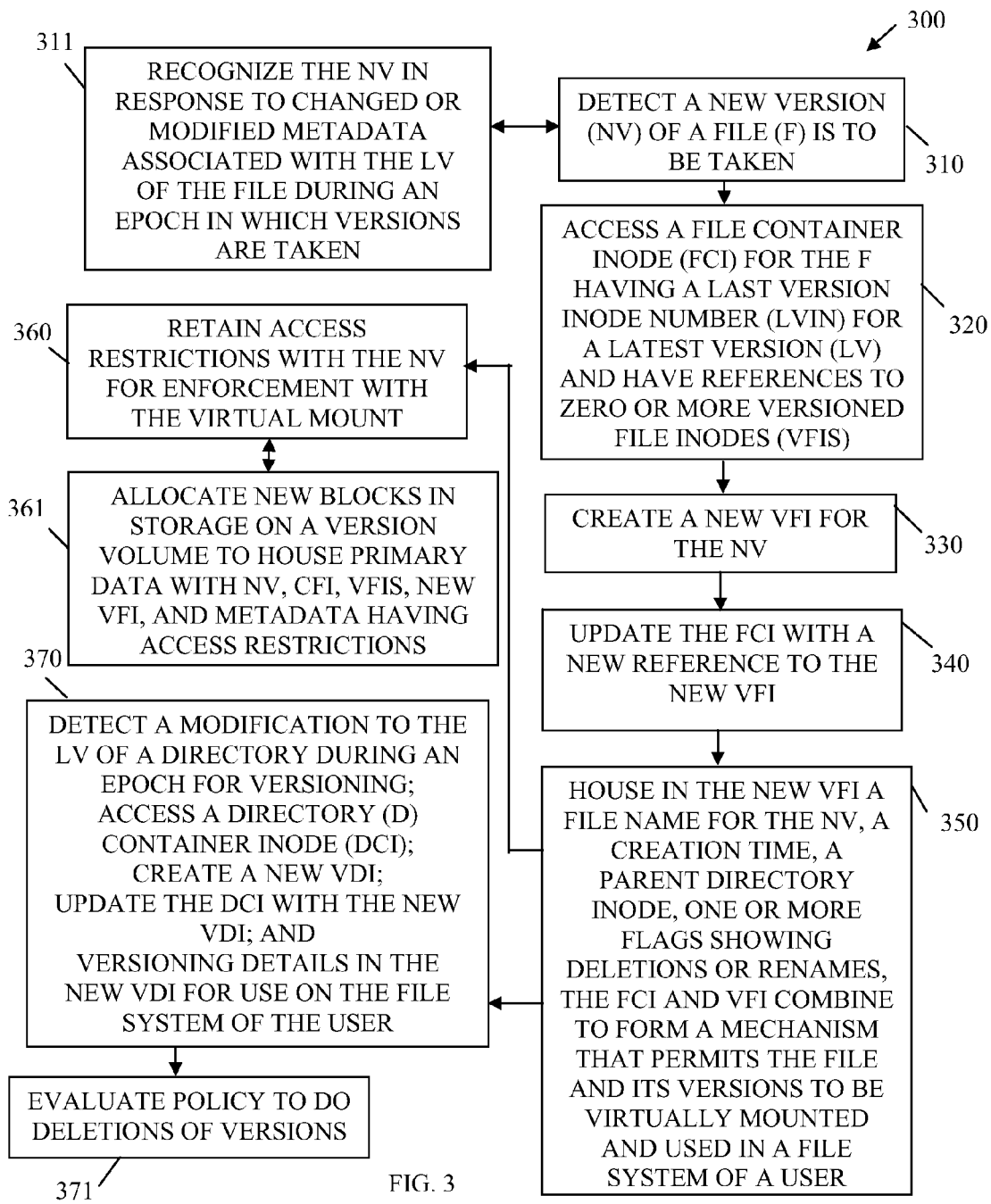
FIG. 3 is a diagram of a still another method for features of a versioning file system, according to an example embodiment.

FIG. 3 is a diagram of a still another method 300 for features of a versioning file system, according to an example embodiment. The method 300 (herein after "versioning management service") is implemented in a machine-accessible and readable medium and is accessible over a network. The network may be wired, wireless, or a combination of wired and wireless. In an embodiment, the versioning management service 300 represents yet another and in some cases still more enhanced perspective to the methods 100 and 200 of the FIGS. 1 and 2, respectively.

At 310, the versioning management service detects that a new version of a file is to be taken. This detection can be achieved in a variety of manners. For example, at 311, the versioning management service recognizes the new version in response to changed or modified metadata that is associated with the latest version of the file. This diction occurs during an epoch for which versions are taken. So, changes in security restrictions to a file can trigger a versioning event during an epoch. Other scenarios exist as well and were presented with the comprehensive example of the FIG. 1.

At 320, the versioning management service accesses a file container inode for the file. The file container inode (FCI) includes a last version inode number and includes zero or more references to more versioned file inodes (VFIs). The creation, relationships, and usages of the FCI and VFIs were presented with the comprehensive example of the FIG. 1.

At 330, the versioning management service creates a new VFI for the new version of the file that is being versioned.

At 340, the versioning management service updates the file's FCI with a new reference to new VFI.

At 350, the versioning management service houses in the new VFI a variety of useful information, such as an original file name for the new version, a creation date and time, a parent directory inode reference, and one or more flags that indicate whether deletions or renames have occurred.

The FCI and the VFIs combine to form a mechanism that permits the file and its versions (including the new version) to be virtually mounted and used in a file system of the user as a directory under the home or root directory of the user and on the user's machine. Specifically, the versioning management service creates and manages the versions via the FCI and the VFIs; this then permits the versioning management service to mount the file, the new version, and any previous version to be displayed in a descriptive manner as a virtual mount on a file system of the user's device. The file system's tools and interface can be accessed by the user to then browse and view the file, the new version, and any previous versions.

According to an embodiment, at 360, the versioning management service also retains access restrictions with the new version. The access restrictions are those that are present at the time the file or directory was versioned. Moreover, the access restrictions are reinforced against the user on the virtual mount, such that the security is not lost from version to version and such that different users may have different access privileges from version to version.

At 361, the versioning management service also allocates new blocks in storage on a version volume to house primary data of the new version, the CFI, the VFIs, the new VFI, and metadata that includes the access restrictions and perhaps other useful information, such as creation date and time, etc.

In an embodiment, at 370, the versioning management service can also version directories in a manner similar to what was described with respect to the file that was versioned. Specifically, the versioning management service can detect a modification to the last version (change in metadata) for a directory during an epoch during which versions are to be taken. Next, a directory container inode (DCI) is accessed by the versioning management service. The DCI includes a latest version inode number identifying the latest version of the directory and references to zero or more versioned directory inodes (VDIs). The versioning management service then creates a new VDI and updates the DCI with the new VDI. The versioning management service houses a variety of information in the new VDI. The information includes, by way of example only, a directory name for the new version of the latest version of the directory, a directory creation date and time, a directory parent inode (acquired from the DCI), and one or more flags that identify whether the directory was deleted and whether the directory is being renamed. Furthermore, the DCI and VDIs combine to form another mechanism that permits the directory, new version of the latest version of the directory, and any previous version of the directory to also be mounted and displayed in similar descriptive manners with the virtual mount on the file system. Again, this permits the user to access tools and interfaces associated with the user's file system to browse and view the directory, new version of the latest version of the directory and the previous versions of the directory.

In an embodiment, at 371, the versioning management service can also periodically evaluate policy and determine when deletions of previous versions of the file and deletions of the previous versions of the directory are to be achieved. The deletions are then dictated by policy.

Figure 4:
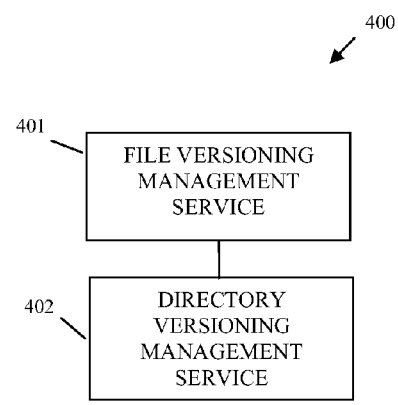
FIG. 4 is a diagram of a versioning file system, according to an example embodiment.

FIG. 4 is a diagram of a versioning file system 400, according to an example embodiment. The versioning file system 400 is implemented as instructions within a machine-accessible and computer-readable medium is accessible over a network. The instructions when executed by a machine (processing device, computer, etc.) implements processing associated with the methods 100-300 of the FIGS. 1-3, respectively. Furthermore, network may be wired, wireless, or a combination of wired and wireless.

The versioning file system 400 includes a file versioning management service 401 and a directory versioning management service 402. Each of these and their interactions with one another will now be discussed in detail.

The file versioning management service 401 is implemented in a machine-accessible and computer-readable medium and processes on a versioning server machine. Example processing associated with the file versioning management service 401 was described in detail above with reference to the methods 100, 200, and 300 of the FIGS. 1-3.

The directory versioning management service 402 is implemented in a machine-accessible and computer-readable medium and processes on the versioning server machine. Example processing associated with the directory versioning management service 402 was described in detail above with reference to the methods 100, 200, and 300 of the FIGS. 1-3.

The file and directory versioning management services 401-402 cooperate with one another to version files and directories of a user. Each version of a particular file or particular directory includes metadata in a name that is displayed to the user. The metadata permits the user to determine a relationship of that particular version to one or more previous versions. Also, each version is accessible via tools and interfaces of a file system associated with the user via a virtual mount from the versioning server machine.

In an embodiment, the file and directory versioning management services 401-402 also each include a mechanism that permit the name having the metadata to exceed a file string length dictated by the file system. This mechanism allows the user to discover a full and original name for the versioned file or directory without the metadata. The full name conforms to the file string length limit of the file system. A specific mechanism for achieving this was described in detail above with reference to the methods 100 and 200 of the FIGS. 1 and 2, respectively.

In some instances, the versions are stored using a delta-based approach. The deltas are used to store differences between the versions to save space on the versioning server.

So, the deltas can be processed to recreate the primary data on demand and when versions are accessed by a user.

Additionally, the file and directory versioning management services 401-402 create new data sets when a prior version of a particular file or a particular directory is renamed or moved so that each data set can be related and at the same time include its own version history managed by the file and directory versioning management services 401-402.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A machine-implemented method, comprising:
mounting a versioning directory on a device for a user;
presenting a separate directory for each different version of a directory associated with the user within the versioning directory, wherein, when accessed by the user, each separate directory appears within a root directory for the user;
providing versioning details with each separate directory and with each versioned file to the user, the versioning details are part of names associated with each separate directory and with each versioned file that are displayed to the user within the versioning directory; and
permitting the user to access, browse and view each separate directory and each versioned file as a part of a local file system.

2. The method of claim 1, wherein mounting further includes mounting the versioning directory in response to a detection that the user is connected to a versioning service of the network or in response to a request received from the user to access a specific version of a particular directory or a particular file.

3. The method of claim 1, wherein mounting further includes creating a virtual mount on a device of the user accessing the versioning directory.

4. The method of claim 1, wherein presenting further includes identifying each directory with a label, the label identifying a version number or whether a particular directory is a latest or a current version.

5. The method of claim 1, wherein providing further includes identifying within a particular name whether a particular directory or a particular file was renamed, deleted, and a date and time when a particular version associated with that particular name was taken.

6. The method of claim 1, wherein providing further includes appending onto at least one name for at least one file an identifier for that file, the identifier is used to access a special directory and access a special file within that directory identified by the identifier and within that special file a particular file name is retrievable, the particular file name exceeds a file system's length limit for files when the particular file name is combined with the versioning details.

7. The method of claim 1 further comprising:
retaining with each different version of the directories and with each different version of files original security restrictions that are enforced against the user when the user accesses the versioning directory; and
permitting the user to browse the versioning directory and access each of the different versions of the directories and each of the different versions of the files using an interface and tools associated with the file system.

8. A method, comprising:
detecting an epoch to version directories and files of a user;
versioning each of the directories and files and retaining security restrictions, directory paths, and names associated with each of the directories and files being versioned by maintaining a table having an entry for each file or directory and each entry including a flag, a current name, and an inode identifier, a bit of the flag indicates whether a particular file or particular directory is active or not; and
creating new names for each of the directories and files that identify descriptive details defining a relationship that each particular directory or each particular file has vis-à-vis its predecessor, wherein some new names include the terms "latest," "renamed-to," "renamed-from," and "deleted" as part of those new names to define some of the relationships.

9. The method of claim 8 further comprising, maintaining mappings between each of the directories and each of the files with their inode numbers for subsequent management and recreation for a user requesting access to the versioned directories and versioned files.

10. The method of claim 9, wherein maintaining further includes including a bit flag within each mapping that provides a portion of the descriptive details, and wherein the bit flag identifies whether there has been a deletion or a rename for a particular directory or a particular file.

11. The method of claim 8, wherein versioning further includes keeping a table with each directory and with each file, each table entry of each table having a file name, a creation date and time, and a parent directory inode for the file or the directory to which that table is associated.

12. The method of claim 11, wherein keeping further includes maintaining a pointer within each table to a latest version for the file or directory to which that table is associated.

13. The method of claim 12, wherein keeping further includes retaining information within each table entry to identify whether a deletion or a rename has occurred.

14. The method of claim 13 further comprising, using selective contents included within each table entry to at least partially create the descriptive details of each directory or each file.

15. A computer-implemented method, comprising:
detecting that a new version of a file is to be taken;
accessing a file container inode (FCI) for the file having a last version inode number for a latest version of the file and having references to zero or more versioned file inodes (VFIs);
creating a new VFI for the new version;
updating the FCI with a new reference to the new VFI; and
housing in the new VFI: a file name for the new version, a creation time, a parent directory inode acquired from the FCI, one or more flags identifying whether the file was deleted and whether the file is being renamed, and the FCI and VFI combine to form a mechanism that permits the file, new version, and any previous versions of the file to be mounted and displayed in a descriptive manner as a virtual mount on a file system of a device for a user under a root directory for that user within the file system and permits the user to use tools and interfaces associated with the file system to access, browse and view the file, new version and the previous versions via the tools and interfaces of the file system.

16. The method of claim 15 further comprising, retaining access restrictions associated with the new version when the new VFI is created for enforcement with the virtual mount on the file system.

17. The method of claim 16, wherein housing further includes allocating new blocks in storage on a version volume to house primary data associated with the new version and the FCI, zero or more VFIs, and the new VFI along with metadata that includes the access restrictions.

18. The method of claim 15, wherein detecting further includes recognizing the new version in response to changed or modified metadata associated with the latest version of the file during an epoch in which versions are to be taken.

19. The method of claim 15 further comprising:
detecting a modification to a latest version of a directory during an epoch in which versions are to be taken;
accessing a directory container inode (DCI) having a latest version inode number identifying the latest version of the directory and references to zero or more versioned directory inodes (VDIs);
creating a new VDI for a new version of the latest version of the directory;
updating the DCI with a new reference to the new VDI; and
housing in new VDI: a directory name for the new version of the latest version of the directory, a directory creation time, a directory parent inode acquired from the DCI, one or more flags identifying whether the directory was deleted and whether the directory is being renamed, and wherein the DCI and VDI combine to form another mechanism that permits the directory, new version of the latest version of the directory, and any previous versions of the directory to also be mounted and displayed in a descriptive manner with the virtual mount on the file system and further permits the user to use the tools and the interfaces associated with the file system to browse and view the directory, new version of the latest version of the directory and the previous versions of the directory.

20. The method of claim 19 further comprising, periodically evaluating policy and determining when deletions of previous versions of the file and deletions of the previous versions of the directory are to be achieved and making the deletions when dictated by the policy.

21. A computer-implemented system, comprising: a file versioning management service implemented in a machine-accessible and readable medium and to process on a versioning server machine; and
a directory versioning management service implemented in a machine-accessible and readable medium and to process on the versioning server machine;
the file versioning management service and the directory versioning management service cooperate with one another to version files and directories of a user and each version of a particular file and a particular directory includes metadata in a name displayed to the user that permits the user to determine a relationship of that version to one or more previous versions, and each version is accessible via tools and interfaces of a file system associated with the user via a virtual mount from the versioning server machine thereby permitting the user to access, browse and view each particular directory and each particular file as a part of the file system, and each particular directory appears within a root directory for the user.

22. The system of claim 21, wherein file and directory versioning management services include a mechanism that permits the name having the metadata to exceed a file string length dictated by the file system and the mechanism allows the user to discover a full name without the metadata that conforms to the file string length of the file system.

23. The system of claim 21, wherein deltas are used to store differences between the versions to save space on the versioning server, and the deltas are processed to recreate primary data associated with the versions when accessed by the user.

24. The system of claim 21, wherein the file and directory versioning management services create new data sets when a prior version of a particular file or a particular directory is renamed or moved so that each data set can be related and at the same time include its own version history managed by the file and directory versioning managed services.

25. The method of claim 1, wherein the versioning details include at least one of the terms "latest," "renamed-to," "renamed-from," or "deleted" as part of the versioning details.

26. The method of claim 1, further comprising maintaining a table having an entry for each file and each directory, each entry including a flag, a current name, and an inode identifier.

27. The system of claim 21, wherein the metadata includes at least one of the terms "latest," "renamed-to," "renamed-from," or "deleted" as part of the name.

28. The system of claim 21, wherein the file versioning management service and the directory versioning management service cooperate with one another to maintain a table having an entry for each file and each directory, each entry including a flag, a current name, and an inode identifier.

29. A non-transitory computer-readable medium storing instructions executable by a processing device to perform operations comprising:
detecting an epoch to version directories and files of a user;
versioning each of the directories and files and retaining security restrictions, directory paths, and names associated with each of the directories and files being versioned by maintaining a table having an entry for each file or directory and each entry including a flag, a current name, and an inode identifier, a bit of the flag indicates whether a particular file or particular directory is active or not; and
creating new names for each of the directories and files that identify descriptive details defining a relationship that each particular directory or each particular file has vis-à-vis its predecessor, wherein some new names include the terms "latest," "renamed-to," "renamed-from," and "deleted" as part of those new names to define some of the relationships.

30. The medium of claim 29, the operations further comprising, maintaining mappings between each of the directories and each of the files with their inode numbers for subsequent management and recreation for a user requesting access to the versioned directories and versioned files.

31. The medium of claim 30, wherein maintaining further includes including a bit flag within each mapping that provides a portion of the descriptive details, and wherein the bit flag identifies whether there has been a deletion or a rename for a particular directory or a particular file.

32. The medium of claim 29 wherein versioning further includes keeping a table with each directory and with each file, each table entry of each table having a file name, a creation date and time, and a parent directory inode for the file or the directory to which that table is associated.

33. A system comprising:
a processing device; and
a computer-readable medium storing instructions executable by the processing device to perform operations comprising:
detecting an epoch to version directories and files of a user;
versioning each of the directories and files and retaining security restrictions, directory paths, and names associated with each of the directories and files being versioned by maintaining a table having an entry for each file or directory and each entry including a flag, a current name, and an inode identifier, a bit of the flag indicates whether a particular file or particular directory is active or not; and
creating new names for each of the directories and files that identify descriptive details defining a relationship that each particular directory or each particular file has vis-à-vis its predecessor, wherein some new names include the terms "latest," "renamed-to," "renamed-from," and "deleted" as part of those new names to define some of the relationships.

34. The system of claim 33, the operations further comprising, maintaining mappings between each of the directories and each of the files with their inode numbers for subsequent management and recreation for a user requesting access to the versioned directories and versioned files.

35. The system of claim 33, wherein versioning further includes keeping a table with each directory and with each file, each table entry of each table having a file name, a creation date and time, and a parent directory inode for the file or the directory to which that table is associated.

36. A non-transitory computer-readable medium storing instructions executable by a processing device to perform operations comprising:
detecting that a new version of a file is to be taken;
accessing a file container inode (FCI) for the file having a last version inode number for a latest version of the file and having references to zero or more versioned file inodes (VFIs);
creating a new VFI for the new version;
updating the FCI with a new reference to the new VFI; and
housing in the new VFI: a file name for the new version, a creation time, a parent directory inode acquired from the FCI, one or more flags identifying whether the file was deleted and whether the file is being renamed, and the FCI and VFI combine to form a mechanism that permits the file, new version, and any previous versions of the file to be mounted and displayed in a descriptive manner as a virtual mount on a file system of a device for a user under a root directory for that user within the file system and permits the user to use tools and interfaces associated with the file system to access, browse and view the file, new version and the previous versions via the tools and interfaces of the file system.

37. The medium of claim 36, the operations further comprising, retaining access restrictions associated with the new version when the new VFI is created for enforcement with the virtual mount on the file system.

38. The medium of claim 37, wherein housing further includes allocating new blocks in storage on a version volume to house primary data associated with the new version and the FCI, zero or more VFIs, and the new VFI along with metadata that includes the access restrictions.

39. The medium of claim 36, wherein detecting further includes recognizing the new version in response to changed or modified metadata associated with the latest version of the file during an epoch in which versions are to be taken.

40. A system comprising:
a processing device; and
a computer-readable medium storing instructions executable by a processing device to perform operations comprising:
detecting that a new version of a file is to be taken;
accessing a file container inode (FCI) for the file having a last version inode number for a latest version of the file and having references to zero or more versioned file inodes (VFIs);
creating a new VFI for the new version;
updating the FCI with a new reference to the new VFI; and
housing in the new VFI: a file name for the new version, a creation time, a parent directory inode acquired from the FCI, one or more flags identifying whether the file was deleted and whether the file is being renamed, and the FCI and VFI combine to form a mechanism that permits the file, new version, and any previous versions of the file to be mounted and displayed in a descriptive manner as a virtual mount on a file system of a device for a user under a root directory for that user within the file system and permits the user to use tools and interfaces associated with the file system to access, browse and view the file, new version and the previous versions via the tools and interfaces of the file system.

41. The system of claim 36, the operations further comprising, retaining access restrictions associated with the new version when the new VFI is created for enforcement with the virtual mount on the file system.

42. The system of claim 37, wherein housing further includes allocating new blocks in storage on a version volume to house primary data associated with the new version and the FCI, zero or more VFIs, and the new VFI along with metadata that includes the access restrictions.

43. The system of claim 36, wherein detecting further includes recognizing the new version in response to changed or modified metadata associated with the latest version of the file during an epoch in which versions are to be taken.

* * * * *

UNITED STATES PATENT AND TRADEMARK OFFICE
CERTIFICATE OF CORRECTION

PATENT NO. : 8,447,733 B2
APPLICATION NO. : 11/949231
DATED : May 21, 2013
INVENTOR(S) : Gosukonda Naga Venkata Satya Sudhakar It is certified that error appears in the above-identified patent and that said Letters Patent is hereby corrected as shown below:

In the Claims:

In Column 15, Line 54, In Claim 3, delete "of" and insert -- for --, therefor.

Signed and Sealed this
Third Day of September, 2013

Teresa Stanek Rea
*Acting Director of the United States Patent and Trademark Office*